United States Patent
Kim

(10) Patent No.: US 9,592,824 B1
(45) Date of Patent: Mar. 14, 2017

(54) METHOD AND DEVICE FOR LEARNING ENGINE CLUTCH KISS POINT OF HYBRID VEHICLE

(71) Applicant: Hyundai Motor Company, Seoul (KR)

(72) Inventor: Dohee Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/212,345

(22) Filed: Jul. 18, 2016

(30) Foreign Application Priority Data

Nov. 16, 2015 (KR) ........................ 10-2015-0160329

(51) Int. Cl.
| | | |
|---|---|---|
| *B60W 10/02* | (2006.01) | |
| *B60W 20/00* | (2016.01) | |
| *F16D 48/06* | (2006.01) | |
| *B60W 30/18* | (2012.01) | |
| *B60W 10/08* | (2006.01) | |

(52) U.S. Cl.
CPC ............ *B60W 20/40* (2013.01); *B60W 10/02* (2013.01); *B60W 10/08* (2013.01); *B60W 30/18054* (2013.01); *F16D 48/066* (2013.01); *B60Y 2300/427* (2013.01); *F16D 2500/1066* (2013.01); *F16D 2500/50263* (2013.01); *F16D 2500/50266* (2013.01); *F16D 2500/70406* (2013.01); *Y10S 903/902* (2013.01)

(58) Field of Classification Search
CPC ...... B60W 20/40; B60W 10/08; B60W 10/02; B60W 30/18054; F16D 48/066; F16D 2500/70406; F16D 2500/50263; F16D 2500/1066
See application file for complete search history.

(56) References Cited

U.S. PATENT DOCUMENTS

| | | | |
|---|---|---|---|
| 2011/0153134 A1 | 6/2011 | Rocq et al. | |
| 2014/0067174 A1* | 3/2014 | Park | F16H 61/061 701/22 |
| 2014/0129104 A1* | 5/2014 | Park | F16D 48/06 701/68 |
| 2014/0163827 A1* | 6/2014 | Kim | B60W 10/11 701/54 |

(Continued)

FOREIGN PATENT DOCUMENTS

| | | |
|---|---|---|
| JP | 2012-086596 A | 5/2012 |
| JP | 2012-121495 A | 6/2012 |

(Continued)

*Primary Examiner* — David J Hlavka
(74) *Attorney, Agent, or Firm* — Mintz Levin Cohn Ferris Glovsky and Popeo, P.C.; Peter F. Corless

(57) ABSTRACT

A method for learning an engine clutch kiss point of a hybrid vehicle includes: determining whether a kiss point learning condition of an engine clutch which connects an engine with a motor or disconnects the engine from the motor is satisfied; controlling a speed of the motor to a first speed; learning a first kiss point of the engine clutch by engaging the engine clutch so that the motor having the first speed is connected to the engine; controlling the speed of the motor to a second speed; learning a second kiss point of the engine clutch by engaging the engine clutch so that the motor having the second speed is connected to the engine; and selecting an average value of the first kiss point and the second kiss point as the engine clutch kiss point when a standard deviation thereof does not exceed a threshold value.

18 Claims, 7 Drawing Sheets

(56) References Cited

U.S. PATENT DOCUMENTS

| | | | | |
|---|---|---|---|---|
| 2015/0019073 | A1* | 1/2015 | Lee | B60W 10/06 701/36 |
| 2015/0151732 | A1* | 6/2015 | Kim | B60W 10/02 701/68 |
| 2015/0266468 | A1* | 9/2015 | Moon | B60W 20/40 701/22 |
| 2016/0025160 | A1* | 1/2016 | Kim | F16D 48/066 701/67 |

FOREIGN PATENT DOCUMENTS

| | | |
|---|---|---|
| JP | 2014-162360 A | 9/2014 |
| KR | 2013-0136779 A | 12/2013 |
| KR | 10-1371461 B1 | 3/2014 |
| KR | 10-1550634 B1 | 9/2015 |

* cited by examiner

METHOD AND DEVICE FOR LEARNING ENGINE CLUTCH KISS POINT OF HYBRID VEHICLE

CROSS-REFERENCE TO RELATED APPLICATION

This application claims under 35 U.S.C. §119(a) the benefit of Korean Patent Application No. 10-2015-0160329 filed in the Korean Intellectual Property Office on Nov. 16, 2015, the entire contents of which are incorporated herein by reference.

BACKGROUND (a) Field of the Invention

The present invention relates to a hybrid vehicle (or a hybrid electric vehicle), and more particularly, to a method and a device for learning an engine clutch kiss point of a hybrid vehicle.

(b) Description of the Related Art

An environmentally-friendly vehicle includes a fuel cell vehicle, an electric vehicle, a plug-in electric vehicle, and a hybrid vehicle, and typically includes a motor to generate driving force.

A hybrid vehicle, which is an example of the environmentally-friendly vehicle, uses an internal combustion engine and power of a battery together. In other words, the hybrid vehicle efficiently combines and uses power of the internal combustion engine and power of a motor.

The hybrid vehicle can include an engine, a motor, an engine clutch to adjust power between the engine and the motor, a transmission, a differential gear apparatus, a battery, a starter-generator that starts the engine or generates electricity by output of the engine, and wheels.

Further, the hybrid vehicle can include a hybrid control unit (HCU) for controlling an entire operation of the hybrid vehicle, an engine control unit (ECU) for controlling an operation of the engine, a motor control unit (MCU) for controlling an operation of the motor, a transmission control unit (TCU) for controlling an operation of the transmission, and a battery control unit (BCU) for controlling and managing the battery.

The battery control unit can be referred to as a battery management system (BMS). The starter-generator can be referred to as an integrated starter and generator (ISG) or a hybrid starter and generator (HSG).

The hybrid vehicle can be driven in a driving mode, such as an electric vehicle (EV) mode, which is an electric vehicle mode using only power of the motor, a hybrid vehicle (HEV) mode, which uses rotational force of the engine as main power and uses rotational force of the motor as auxiliary power, and a regenerative braking (RB) mode for collecting braking and inertial energy during driving by braking or inertia of the vehicle through electricity generation of the motor to charge the battery.

The hybrid vehicle operates the engine clutch in order to transmit power or separate power between the motor and the engine for switching the mode. Operation hydraulic pressure of the engine clutch determining an operation of the engine clutch considerably influences drivability, power performance, and fuel efficiency of the hybrid vehicle, so that the operation hydraulic pressure of the engine clutch needs to be accurately controlled.

The operation hydraulic pressure of the engine clutch may be determined by initial hydraulic pressure by which torque is started to be transmitted as both ends of friction material of the engine clutch are in contact with each other, and feedback hydraulic pressure for adjusting the hydraulic pressure of the engine clutch by receiving feedback of speeds of the engine and the motor. The initial hydraulic pressure point may be called a kiss point.

The kiss point may be changed during the use of the engine clutch. Accordingly, it is necessary to control hydraulic pressure of the engine clutch so that the engine clutch may transmit the torque at an appropriate point by learning the kiss point.

The above information disclosed in this Background section is only for enhancement of understanding of the background of the invention and therefore it may contain information that does not form the prior art that is already known in this country to a person of ordinary skill in the art.

SUMMARY

The present invention provides a method and a device for learning an engine clutch kiss point of a hybrid vehicle which are capable of improving robustness of kiss point learning for an engine clutch by learning multiple kiss points.

An exemplary embodiment of the present invention may provide the method for learning engine clutch kiss point of the hybrid vehicle, including: determining, by a controller, whether kiss point learning condition of an engine clutch which connects an engine with a motor or disconnects the engine from the motor is satisfied; controlling, by the controller, a speed of the motor to be maintained at a first speed when the kiss point learning condition is satisfied; learning, by the controller, a first kiss point of the engine clutch by engaging the engine clutch so that the motor having the first speed is connected to the engine; controlling, by the controller, the speed of the motor to be maintained at a second speed after the first kiss point of the engine clutch is learned; learning, by the controller, a second kiss point of the engine clutch by engaging the engine clutch so that the motor having the second speed is connected to the engine; and selecting, by the controller, an average value of the first kiss point and the second kiss point as the engine clutch kiss point when a standard deviation of the first kiss point and the second kiss point is less than or equal to a threshold value.

The controller may determine that the kiss point learning condition is satisfied when a transmission transmitting output from the engine and the motor is in a park stage or a neutral stage.

The controller determines that the kiss point learning condition is satisfied when a transmission transmitting output from the engine and the motor is in a drive stage and the hybrid vehicle is in coasting drive.

The method for learning engine clutch kiss point of the hybrid vehicle may further include: controlling, by the controller, the speed of the motor to be maintained at a third speed after the second kiss point is learned when the standard deviation of the first kiss point and the second kiss point is not less than or equal to the threshold value; learning, by the controller, a third kiss point of the engine clutch by engaging the engine clutch so that the motor having the third speed is connected to the engine; and selecting, by the controller, an average value of the first kiss point, the second kiss point, and the third kiss point as the engine clutch kiss point when a standard deviation of the first kiss point, the second kiss point, and the third kiss point is less than or equal to the threshold value.

The method for learning engine clutch kiss point of the hybrid vehicle may further include: determining, by the controller, whether the third speed is less than or equal to a learning limit speed which restricts learning for the engine clutch kiss point; and terminating, by the controller, learning for the engine clutch kiss point when the third speed is less than or equal to the learning limit speed.

The method for learning engine clutch kiss point of the hybrid vehicle may further include: selecting, by the controller, the first kiss point or the second kiss point as a hydraulic pressure of the engine clutch corresponding to a speed change amount threshold value of the motor which occurs when the engine clutch is engaged.

Another exemplary embodiment of the present invention may provide the method for learning engine clutch kiss point of the hybrid vehicle, including: determining, by a controller, whether kiss point learning condition of an engine clutch which connects an engine with a motor or disconnects the engine from the motor is satisfied; controlling, by the controller, a speed of the motor to be maintained at a first speed when the kiss point learning condition is satisfied; learning, by the controller, a first kiss point of the engine clutch by engaging the engine clutch so that the motor having the first speed is connected to the engine; controlling, by the controller, the speed of the motor to be maintained at a second speed of the motor which is generated after the engine clutch is engaged; learning, by the controller, a second kiss point of the engine clutch by engaging the engine clutch so that the motor having the second speed is connected to the engine; and selecting, by the controller, an average value of the first kiss point and the second kiss point as the engine clutch kiss point when a standard deviation of the first kiss point and the second kiss point is less than or equal to a threshold value.

The controller may determine that the kiss point learning condition is satisfied when a transmission transmitting output from the engine and the motor is in a park stage or a neutral stage.

The controller may determine that the kiss point learning condition is satisfied when a transmission transmitting output from the engine and the motor is in a drive stage and the hybrid vehicle is in coasting drive.

The method for learning engine clutch kiss point of the hybrid vehicle may further include: controlling, by the controller, the speed of the motor to be maintained at a third speed of the motor which is generated after the second kiss point is learned and the engine clutch is engaged when the standard deviation of the first kiss point and the second kiss point is not less than or equal to the threshold value; learning, by the controller, a third kiss point of the engine clutch by engaging the engine clutch so that the motor having the third speed is connected to the engine; and selecting, by the controller, an average value of the first kiss point, the second kiss point, and the third kiss point as a kiss point of the engine clutch when a standard deviation of the first kiss point, the second kiss point, and the third kiss point is less than or equal to the threshold value.

The method for learning engine clutch kiss point of the hybrid vehicle may further include: determining, by the controller, whether the third speed is less than or equal to a learning limit speed which restricts learning for the kiss point of the engine clutch; and terminating, by the controller, learning for the engine clutch kiss point when the third speed is less than or equal to the learning limit speed.

The method for learning engine clutch kiss point of the hybrid vehicle may further include: selecting, by the controller, the first kiss point as a hydraulic pressure of the engine clutch corresponding to the second speed; and selecting, by the controller, the second kiss point as a hydraulic pressure of the engine clutch corresponding to a third speed of the motor which is generated after the second kiss point is learned and the engine clutch is engaged.

An exemplary embodiment of the present invention may provide the device for learning engine clutch kiss point of a hybrid vehicle, including: an engine clutch which connects an engine with a motor or disconnects the engine from the motor; and a controller which determines whether kiss point learning condition of the engine clutch is satisfied. The controller may control a speed of the motor to be maintained at a first speed when the kiss point learning condition is satisfied, the controller may learn a first kiss point of the engine clutch by engaging the engine clutch so that the motor having the first speed is connected to the engine, the controller may control the speed of the motor to be maintained at a second speed of the motor which is generated after the engine clutch is engaged, the controller may learn a second kiss point of the engine clutch by engaging the engine clutch so that the motor having the second speed is connected to the engine, and the controller may select an average value of the first kiss point and the second kiss point as the engine clutch kiss point when a standard deviation of the first kiss point and the second kiss point is less than or equal to a threshold value.

The controller may determine that the kiss point learning condition is satisfied when a transmission transmitting output from the engine and the motor is in a park stage or a neutral stage.

The controller may determine that the kiss point learning condition is satisfied when a transmission transmitting output from the engine and the motor is in a drive stage and the hybrid vehicle is in coasting drive.

The controller may control the speed of the motor to be maintained at a third speed of the motor which is generated after the second kiss point is learned and the engine clutch is engaged when the standard deviation of the first kiss point and the second kiss point is not less than or equal to the threshold value, the controller may learn a third kiss point of the engine clutch by engaging the engine clutch so that the motor having the third speed is connected to the engine, and the controller may select an average value of the first kiss point, the second kiss point, and the third kiss point as a kiss point of the engine clutch when a standard deviation of the first kiss point, the second kiss point, and the third kiss point is less than or equal to the threshold value.

The controller may determine whether the third speed is less than or equal to a learning limit speed which restricts learning for the engine clutch kiss point, and may terminate learning for the engine clutch kiss point when the third speed is less than or equal to the learning limit speed.

The controller may select the first kiss point as a hydraulic pressure of the engine clutch corresponding to the second speed, and may select the second kiss point as a hydraulic pressure of the engine clutch corresponding to a third speed of the motor which is generated after the second kiss point is learned and the engine clutch is engaged.

The method and the device for learning an engine clutch kiss point of the hybrid vehicle according to the exemplary embodiment of the present invention may improve learning reliability by learning multiple kiss points. Thus, the embodiment of the present invention may prevent operational degradation of the vehicle due to engagement shock that may occur when a single kiss point learning value is used as a representative value.

Further, the embodiment of the present invention may use a minimal amount of energy by employing no-load torque compensation for a driving motor to learn the multiple kiss points, thereby reducing energy consumption.

BRIEF DESCRIPTION OF THE DRAWINGS

A brief description of the drawings will be provided to more sufficiently understand the drawings which are used in the detailed description of the present invention.

DETAILED DESCRIPTION OF THE EMBODIMENTS

Figure 1:
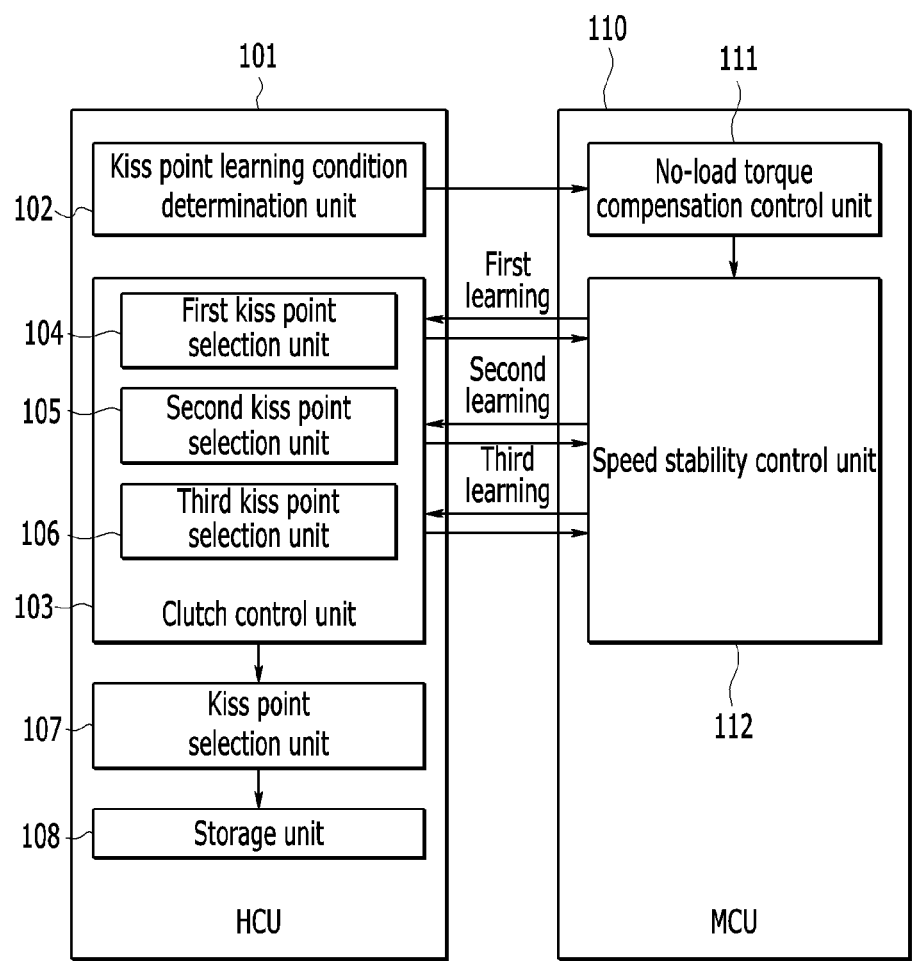
FIG. 1 is a block diagram for explaining a device for learning an engine clutch kiss point of a hybrid vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the present invention will be described in detail by describing exemplary embodiments of the present invention with reference to the accompanying drawings. In describing the present invention, well-known configurations or functions will not be described in detail since they may unnecessarily obscure the gist of the present invention. Throughout the accompanying drawings, the same reference numerals will be used to denote the same components.

Because an engine clutch of a hybrid vehicle is used to couple an engine and a motor (or a drive motor) that are included in multi-power source, transient state control of the engine clutch has a profound effect on operation of the vehicle. Therefore, data for transient state control is established by learning a kiss point (or a torque transmission kiss point) of the engine clutch. In kiss point learning of the engine clutch, a kiss point that is made artificially is learned by engagement control of the engine clutch so that change of the kiss point is learned.

In kiss point learning according to related art, a result value that is selected by performing engagement control in a single learning target speed of the motor is used as a representative value of the kiss point. However, recently, as engine clutch control for hybrid vehicles has become more advanced and more precise, demand for more precise learning and learning reliability has increased.

A method and a system for learning and controlling kiss point of a engine clutch for a hybrid electric vehicle that are related art and are disclosed in Korea Patent Registration No. 10-1371461 controls a motor speed to be maintained at a different speed from an engine rotational speed. A learning system for engine clutch delivery torque of a green car and a method thereof that are related art and are disclosed in Korea Patent Publication No. 10-2013-0136779 drives a motor as a no-load state when delivery torque learning condition of an engine clutch is satisfied so that the related art converges the motor speed to a target speed.

In the above related art, the motor speed converges to a predetermined speed for learning the kiss point. Because a method of converging the motor speed to the predetermined speed is applied to only kiss point learning that learns the kiss point only in a single speed, there are many restrictions when the method is applied to multiple kiss points learning.

In more detail, the related art considers a kiss point value learned in the single speed of the motor as a representative value and uses the learned kiss point as a representative value for the engine clutch engagement after learning. If the selected representative value is determined incorrectly, a problem such as engagement shock that is generated when the engine clutch is engaged after kiss point learning for the engine clutch may occur. In order to improve reliability of the learning, reliability of kiss point learning must be performed by learning multiple kiss points.

In the related art, in order to maintain the motor speed constant for the kiss point learning, a target value of the motor speed should be continuously set. Speed of the motor tends to be maintained at the set speed. Therefore, it is difficult to apply the related art to the multiple kiss points learning. Because a speed control method of the motor according to the related art repeatedly performs control for following a target speed that is generated in variation of the motor according to continuous kiss point learning, the speed control method is disadvantageous in terms of time and energy. In the related art, in order to maintain the motor speed constant for the multiple kiss points learning, preset of multiple target speeds and multiple speed control loop may be required. In order to learn multiple kiss points, a method for converging the motor speed to multiple speeds may be required.

Figure 7:
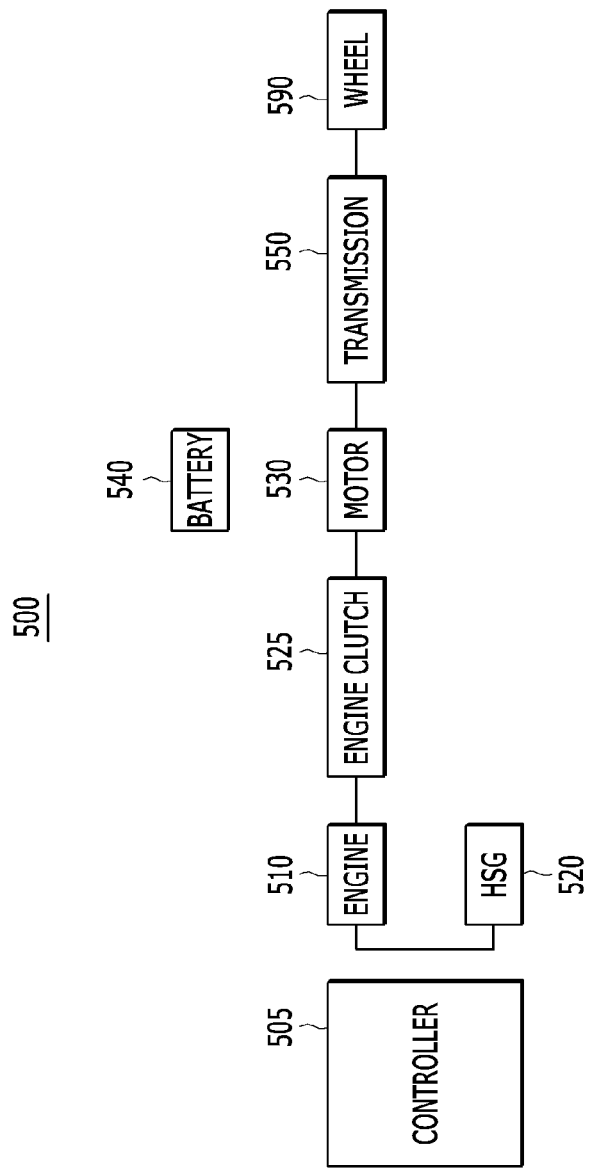
FIG. 7 is a block diagram for explaining the hybrid vehicle including the device for learning an engine clutch kiss point according to an exemplary embodiment of the present invention.

FIG. 1 is a block diagram for explaining a device for learning an engine clutch kiss point of a hybrid vehicle according to an exemplary embodiment of the present invention. FIG. 7 is a block diagram for explaining the hybrid vehicle including the device for learning an engine clutch kiss point according to an exemplary embodiment of the present invention.

Referring to FIGS. 1 and 7, the device for learning an engine clutch kiss point of the hybrid vehicle includes a hybrid control unit (HCU) 101, a motor control unit (MCU) 110, and an engine clutch 525.

The HCU 101 includes a kiss point learning condition determining unit 102, a clutch control unit 103, a kiss point selecting unit 107, and a storage unit 108. The clutch control unit 103 includes a first kiss point selection unit 104, a second kiss point selection unit 105, and a third kiss point selection unit 106. The kiss point may mean an initial hydraulic pressure by which torque is started to be transmitted as two friction members included in the engine clutch are in contact with each other. A slip state of the engine clutch 525 may be started at the kiss point.

The MCU 110 includes a no-load torque compensation control unit 111 and a speed stabilization control unit 112. In another embodiment of the present invention, the speed stabilization control unit 112 may be omitted in the MCU 110.

The kiss point learning condition determining unit 102 may determine whether kiss point learning condition of the engine clutch 525 is satisfied. The kiss point learning condition determining unit 102 may determine that the kiss point learning condition is satisfied when a transmission 550 transmitting outputs from the engine 510 and the motor 530 is in a park stage or a neutral stage. In another embodiment of the present invention, the kiss point learning condition determining unit 102 may determine that the kiss point learning condition is satisfied when the transmission 550 is in a drive stage (or a driving stage) and the hybrid vehicle 500 is in coasting drive.

The kiss point learning condition is described as follows. A shifting stage (or a gear shift stage) of the transmission 550 may be the park stage, the neutral stage, or the drive stage. Because a state of the transmission 550 that is a power system is a neutral state in the neutral stage, the transmission 550 may not transmit power of a power source including the engine and the motor. A load state of the motor 530 that is a power system may be a no load state. In the park stage or the neutral stage, a state of the hybrid vehicle 500 may be a stationary state. In the drive stage, the hybrid vehicle 500 may be in coasting drive and a clutch included in the transmission 550 may be released (or opened). In coasting drive condition, an accelerator pedal position value detected by an acceleration pedal position sensor (APS) included in the hybrid vehicle 500 and a brake pedal position value detected by a brake pedal position sensor (BPS) of the hybrid vehicle 500 may be 0%. The APS may continuously measure a position value of an accelerator pedal and may transmit the measured signal to the kiss point learning condition determining unit 102. The position value of the accelerator pedal may be 100% when the accelerator pedal is fully depressed and the position value of the accelerator pedal may be 0% when the accelerator pedal is not depressed. The BPS may continuously measure a position value of a brake pedal and may transmit the measured signal to the kiss point learning condition determining unit 102. The position value of the brake pedal may be 100% when the brake pedal is fully depressed and the position value of the brake pedal may be 0% when the brake pedal is not depressed. A state of charge (SOC) of a battery 540 is within a specific range and a charging limit value and a discharging limit value of the battery 540 may be greater than or equal to a certain value. A combustion chamber of the engine 510 should be completely exploded and speed of the motor 530 should be maintained constant.

The no-load torque compensation control unit 111 may control speed of the motor 530 to be maintained at a first speed when the kiss point learning condition is satisfied. The no-load torque compensation control unit 111 may control speed of the motor 530 to be maintained at a second speed of the motor which is generated after the engine clutch 525 is engaged. The second speed may be generated by the engine 510 (or the speed of the engine 510) having a specific speed and may be generated after the first speed is generated.

Figure 2:
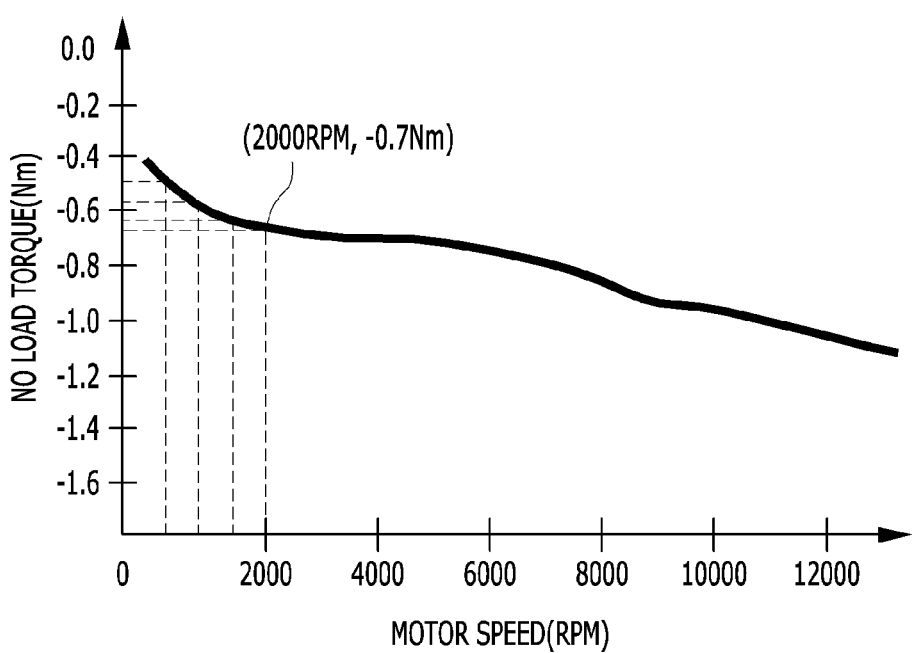
FIG. 2 is a graph for explaining no-load torque that constantly maintains speed of a motor controlled by a no-load torque compensation control unit shown in FIG. 1.

The no-load torque compensation control unit 111 may enable continuous maintenance of constant speed of the motor 530 based on a no-load torque curve (or a characteristic curve of the motor) shown in FIG. 2. In other words, the no-load torque compensation control unit 111 may perform no-load torque compensation control for the motor 530.

The speed stability control unit 112 may control the first speed and the second speed to be stabilized.

The first kiss point selection unit 104 may learn (or select) a first kiss point of the engine clutch 525 by engaging the engine clutch so that the motor 530 having the first speed is connected to the engine 510. The first kiss point selection unit 104 may select the first kiss point as a hydraulic pressure of the engine clutch corresponding to the second speed.

The second kiss point selection unit 105 may learn a second kiss point of the engine clutch 525 by engaging the engine clutch so that the motor 530 having the second speed is connected to the engine 510. The second kiss point selection unit 105 may select the second kiss point as a hydraulic pressure of the engine clutch 525 corresponding to a third speed of the motor 530 which is generated after the second kiss point is learned and the engine clutch is engaged.

The kiss point selection unit 107 may select an average value of the first kiss point and the second kiss point as a kiss point of the engine clutch 525 when a standard deviation of the first kiss point and the second kiss point is less than or equal to a threshold value (or a reference value). The kiss point of the engine clutch 525 may be stored in the storage unit 108 and the stored value may be used as a control value for the engine clutch in a hybrid electric vehicle (HEV) mode of the hybrid vehicle 500.

The no-load torque compensation control unit 111 may control speed of the motor 530 to be maintained at a third speed of the motor which is generated after the second kiss point is learned and the engine clutch 525 is engaged when the standard deviation of the first kiss point and the second kiss point is not less than or equal to the threshold value. The third speed may be generated by the engine 510 having a specific speed and may be generated after the second speed is generated.

The speed stability control unit 112 may control the third speed to be stabilized.

The third kiss point selection unit 106 may learn a third kiss point of the engine clutch 525 by engaging the engine clutch so that the motor 530 having the third speed is connected to the engine 510. The third kiss point selection unit 105 may select the third kiss point as a hydraulic pressure of the engine clutch 525 corresponding to a fourth speed of the motor 530 which is generated after the third kiss point is learned and the engine clutch is engaged.

The kiss point selection unit 107 may select an average value of the first kiss point and the second kiss point and the third kiss point as a kiss point of the engine clutch 525 when a standard deviation of the first kiss point and the second kiss point and the third kiss point is less than or equal to the threshold value. The kiss point of the engine clutch 525 may be stored in the storage unit 108 and the stored value may be used as the control value for the engine clutch in the HEV mode of the hybrid vehicle 500.

An end control unit (not shown) that may be included in the HCU 101 may determine (or check) whether the third speed is less than or equal to a learning limit speed which restricts learning for the kiss point of the engine clutch 525 and is a minimum speed for learning. The end control unit may terminate learning for the kiss point of the engine clutch 525 when the third speed is less than or equal to the learning limit speed.

When a standard deviation of the first kiss point through an nth kiss point is not less than or equal to the threshold value, operations that are similar to operations of the no-load torque compensation control unit 111, the speed stability control unit 112, an nth kiss point selection unit included in the clutch control unit 103, the kiss point selection unit 107, the storage unit 108, and the end control unit may be performed in the no-load torque compensation control unit 111, the speed stability control unit 112, an n+1th kiss point selection unit (not shown) included in the clutch control unit 103, the kiss point selection unit 107, the storage unit 108, and the end control unit. The n may be a natural number that is three or more.

In another embodiment of the present invention, the HCU 101 and the MCU 110 may be integrated into a single controller 505. The controller 505 may perform operations of the HCU 101 and the MCU 110.

Figure 3:
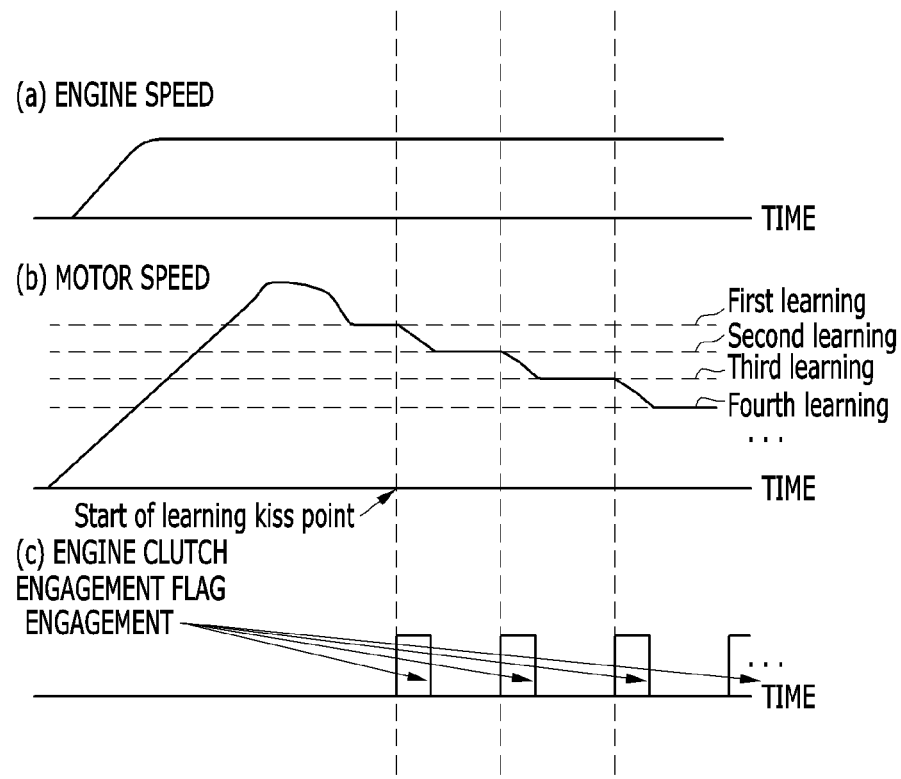
FIG. 3 is a graph representing the speed of the motor used for selecting a kiss point of an engine clutch shown in FIG. 1.

FIG. 2 is a graph for explaining no-load torque that maintains speed of the motor controlled by the no-load torque compensation control unit shown in FIG. 1. FIG. 3 is a block diagram for representing the speed of the motor used for selecting a kiss point of the engine clutch shown in FIG. 1.

As shown in FIG. 3, the controller 505 may operate the engine 510 that is stopped to control speed (or rotational speed) of the engine 510 to be kept constant. Speed of the engine 510 may be different to the first speed, the second speed, and the third speed of the motor 530. Engagement of the engine clutch 525 in a no-load state may act as a load of the motor 530 to cause a change in speed of the motor 530. The change in speed of the motor 530 may include an increase in speed of the motor or a decrease in speed of the motor, and the decreased speed of the motor may include the second speed and the third speed. For example, the first speed, the second speed, and the third speed may be higher than a specific speed of the engine 510. The second speed may be lower than the first speed and the third speed may be lower than the second speed.

Because the load state of the motor 530 is the no-load state, speed (or rotational speed) of the motor 530 may be maintained constant by compensating only speed reduction of the motor according to the motor characteristics. When the speed of the motor 530 is determined, the no-load torque may be determined at the no-load torque curve according to the motor speed illustrated in FIG. 2. For example, −0.7 Nm of torque (no-load torque) may be required in order to maintain the speed of the motor at 2000 revolutions per minute (RPM) in the no-load torque curve, and thus the speed of the motor may be maintained at 2000 RPM by inputting 0.7 Nm of torque to the motor.

The controller 505 may perform no-load torque compensation control to generate no-load torque shown in FIG. 2. The no-load torque compensation control may mean control that generates torque (or compensation torque) applied to the motor 530 in order to constantly maintain the speed (or a rotation speed) of the motor in a state (e.g., the park stage or the neutral stage of the transmission 550) in which a load is not connected to the motor.

In more detail, the controller 505 may increase the speed of the motor 530 to a specific speed by generating a motor torque command so that the controller may perform the no-load torque compensation control to maintain the specific speed. The controller 505 may provide a no-load motor torque command depending on the speed of the motor 530 to an inverter that provides a three-phase AC voltage to the motor based on a no-load torque graph shown in FIG. 2. For example, the controller 505 may control the inverter to output a current (or a voltage) corresponding to 0.7 Nm of torque (no-load torque), in order to maintain the speed of the motor 530 at 2000 RPM in the no-load state (e.g., the park stage or the neutral stage of the transmission). Therefore, in the no-load state, the speed of the motor 530 may be kept constant with minimum compensation. The value of the no-load torque may be given in hardware specifications of the motor.

When speed of the motor is stabilized by maintaining the motor speed constant, a first kiss point learning that is a first kiss point control may be started.

An engagement control value that generates speed change (or torque change) of the motor 530 by engaging the engine clutch 525 may be selected (or stored) as the first kiss point, and then the first kiss point learning may be completed. The engagement control value may mean a hydraulic-pressure command value (or a fluid displacement command value) that moves a friction member of the engine clutch. When the first kiss point learning is completed, the no-load torque compensation control for the motor 530 may be started. When speed of the motor is stabilized by maintaining the motor speed constant, a second kiss point learning may be started.

An engagement control value that generates speed change of the motor 530 by engaging the engine clutch 525 may be selected as the second kiss point, and then the second kiss point learning may be completed. When the second kiss point learning is completed, the no-load torque compensation control for the motor 530 may be started. After the no-load torque compensation control is started, an nth kiss point learning similar to the first kiss point learning method or the second kiss point learning method may be performed. The n may be a natural number that is three or more.

A method for selecting a kiss point learning value of the engine clutch by using learning values of multiple kiss points is explained as follows.

When a standard deviation of a first kiss point learning value to an nth kiss point learning value corresponding to an equation below is less than or equal to the threshold value, an average value of the learning values shown in the equation may be selected and stored as the kiss point learning value of the engine clutch. The threshold value may be a standard deviation that ensures learning reliability determined in advance.

[Equation]

The average value of the learning values=(the first kiss point learning value+the second kiss point learning value+ . . . +the $n$th kiss point learning value)/$n$ The standard deviation of the learning values=$[\{$(the first kiss point learning value−the average value of the learning values)$^2$+(the second kiss point learning value−the average value of the learning values)$^2$+ . . . +(the $n$th kiss point learning value−the average value of the learning values)$^2$$\}/n]^{1/2}$ In the equation, the n may be a natural number that is three or more. When the standard deviation exceeds the threshold value, the kiss point learning value may be ignored and may not be selected by determining that the learning reliability is low.

When speed of the motor 530 is less than or equal to the predetermined learning limit speed (e.g., 1000 RPM), learning for the kiss point of the engine may be terminated. Also, when the kiss point learning condition is not satisfied, learning for the kiss point of the engine may be terminated.

Referring to FIGS. 1 and 7 again, the hybrid vehicle 500 includes the controller 505, the engine 510, a hybrid starter-generator (HSG) 520, the engine clutch 525, the motor (or a driving motor) 530 which may be an electric motor, a battery 540, the transmission 550, and wheels (or driving wheels) 590.

The hybrid vehicle 500, which is a hybrid electric vehicle, may use the engine 510 and the motor 530 as power sources, and includes the engine clutch 525 existing between the engine 510 and the motor 530 so that the hybrid vehicle 500 may be operated in an electric vehicle (EV) mode in which the hybrid vehicle 500 travels by the motor 530 in a state where the engine clutch 525 is opened, and in the HEV mode in which the hybrid vehicle 500 is capable of travelling by both the motor 530 and the engine 510 in a state where the engine clutch 525 is closed.

The hybrid vehicle 500 may include a power train of a transmission mounted electric device (TMED) type in which the motor 530 is connected to the transmission 550. The hybrid vehicle 500 may provide a driving mode, such as the EV mode, which is the electric vehicle mode using only power of the motor, and the HEV mode, which uses rotational force of the engine as main power and uses rotational force of the motor as auxiliary power depending on whether the engine clutch 525 that is disposed between the engine 510 and the motor 530 is engaged (or connected). In more detail, in the hybrid vehicle 500 including a structure in which the motor 530 may be directly connected to the transmission 550, RPM of the engine may be increased by drive of the HSG 520, power delivery and power cutoff between the engine and the motor may be performed via engagement and release of the clutch 525, a driving force may be transmitted (or transferred) to the wheels 590 through a power transmission system which may include the transmission 550, and torque of the engine may be transmitted to the motor via engagement of the clutch 525 when transmission of the engine torque is requested.

The controller 505 may include the HCU 101, the MCU 110, an engine control unit (ECU), and a transmission control unit (TCU).

The HCU may control starting of the engine by controlling the HSG 520 when the engine 510 stops. The HCU may be the highest controller, and may synthetically control controllers (for example, the MCU) connected to a network such as a controller area network (CAN) which is a vehicle network, and may control overall operation of the hybrid vehicle 500.

The MCU 110 may control the HSG 520 and the motor 530. The MCU 110 may control an output torque of the driving motor 530 through the network depending on the control signal output from the HCU, and thus may control the motor to operate at maximum efficiency. The MCU may include an inverter configured as a plurality of power switching elements. A power switching element included in the inverter may include an insulated gate bipolar transistor (IGBT), a field effect transistor (FET), a metal oxide semiconductor FET (MOSFET), a transistor, or a relay. The inverter converts a direct current (DC) voltage that is supplied from the battery 540 into a three-phase alternating current (AC) voltage to drive the driving motor 530. The MCU may be disposed between the battery 540 and the motor 530.

The ECU may control a torque of the engine 510. The ECU may control an operating point (or a driving point) of the engine 510 through the network depending on a control signal output from the HCU, and may control the engine to output an optimal torque. The TCU may control an operation of the transmission 550.

The controller 505 may determine whether power transference of the transmission 550 transmitting the output from the engine 510 and the motor 530 is interrupted by using a sensor that may be connected (or attached) to the transmission 550. The controller 505 may determine that power transference of the transmission 550 is interrupted when the transmission 550 is in the park stage or the neutral stage.

When a gear shift stage of the transmission 550 is in the park stage or the neutral stage, the engine 510 and the motor 530 may be in a no-load state and the hybrid vehicle 500 may be in a non-movement state. In other words, when the gear shift stage is in the park stage or the neutral stage, an accelerator is not operated so that the vehicle may not be operated. For example, the controller 505 may determine whether the gear shift stage is in the park stage or the neutral stage by using an inhibitor switch.

For example, the controller 505 may be one or more microprocessors operated by a program or hardware including the microprocessor. The program may include a series of commands for executing a method for learning an engine clutch kiss point of the hybrid vehicle according to an exemplary embodiment of the present invention, which will be described below.

The engine 510 may include a diesel engine, a gasoline engine, a liquefied natural gas (LNG) engine, or a liquefied petroleum gas (LPG) engine, and may output a torque at the operating point depending on a control signal output from the ECU. The torque may be combined with driving force of the driving motor 530 in the HEV mode.

The HSG 520 may operate as a motor depending on a control signal output from the MCU to start the engine 510, and may operate as a generator in a state in which start of the engine 510 is maintained to provide generated electric power to the battery 540 via the inverter. The HSG 520 may be connected to the engine 510 through a belt.

The engine clutch 525 may be disposed (or mounted) between the engine 510 and the driving motor 530, and may be operated to switch power delivery between the engine 510 and the motor 530. The engine clutch 525 may connect or intercept power between the engine and the motor depending on switching of the HEV mode and the EV mode. Operation of the engine clutch 525 may be controlled by the controller 505.

The engine clutch 525 may be engaged by pressure of a fluid (e.g., oil) that is supplied to the engine clutch 525. The pressure of fluid for engaging the engine clutch 525 may be pressure above the kiss point that is start engagement pressure of the engine clutch, and may be controlled by the controller 505. The kiss point may be a starting point of torque delivery, and may be the pressure of the fluid that converts a state of the engine clutch into a slip state in which the clutch starts friction. The pressure of fluid may correspond to a current applied to a solenoid valve of the engine clutch 525 for adjusting the pressure of the fluid. As the current applied to the solenoid valve increases, the pressure of fluid supplied to two friction members that are included in the engine clutch 525 may increase. When the pressure of fluid applied to the friction members increases, contact frictional force of the friction members may increase. Accordingly, torque transmitted by the engine clutch may be increased in proportion to the current applied to the solenoid valve.

The motor 530 may be operated by a three-phase AC voltage that is output from the MCU to generate a torque. The motor 530 may be operated as a generator during coasting drive or regenerative braking to supply a voltage (or regenerative energy) to the battery 540.

The battery 540 may include a plurality of unit cells. A high voltage for providing a driving voltage (for example, 350-450 V DC) to the motor 530 that provides driving power to the wheels 590 may be stored in the battery 540.

The transmission 550 may include a multiple speed transmission, such as an automatic transmission or a dual clutch transmission (DCT), or a continuously variable transmission (CVT), and may shift to a desired gear by using hydraulic pressure depending on control of the TCU to operate engagement elements and disengagement elements. The transmission 550 may transmit driving force of the engine 510 and/or the motor 530 to the wheels 590, and may intercept power delivery between the motor 530 (or the engine 510) and the wheels 590.

Figure 4:
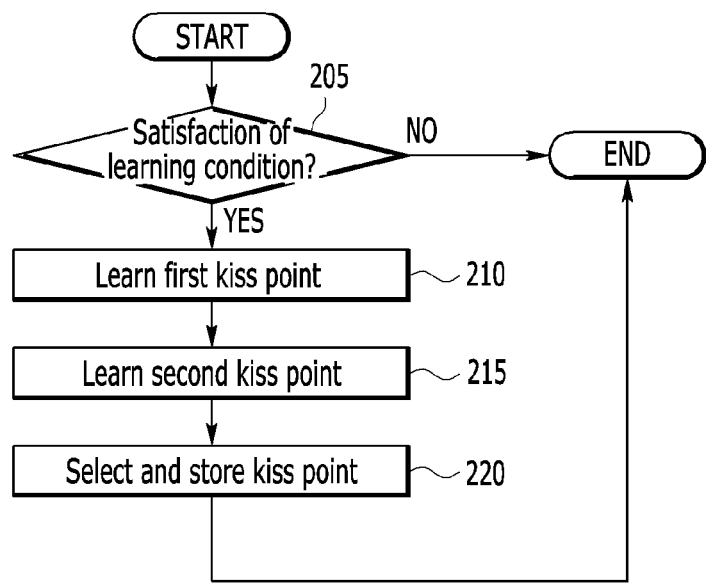
FIG. 4 is a flowchart describing an exemplary embodiment of a method for learning engine clutch kiss point of the hybrid vehicle corresponding to the device for learning engine clutch kiss point shown in FIG. 1.
Figure 5:
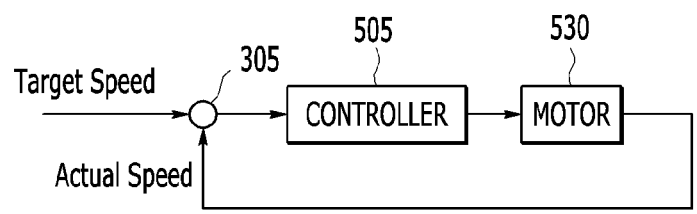
FIG. 5 is a block diagram for explaining an embodiment of a kiss point learning step shown in FIG. 4.
Figure 6:
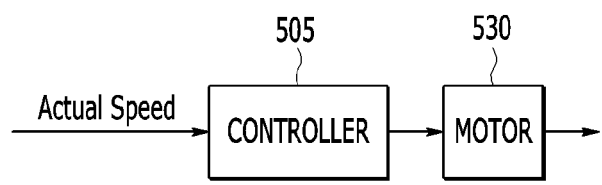
FIG. 6 is a block diagram for explaining another embodiment of the kiss point learning step shown in FIG. 4.

FIG. 4 is a flowchart describing an exemplary embodiment of the method for learning an engine clutch kiss point of the hybrid vehicle corresponding to the device for learning an engine clutch kiss point shown in FIG. 1. FIG. 5 is a block diagram for explaining an embodiment of a kiss point learning step shown in FIG. 4. FIG. 6 is a block diagram for explaining another embodiment of the kiss point learning step shown in FIG. 4. The method for learning an engine clutch kiss point of the hybrid vehicle may be applied to the hybrid vehicle 500 including the device for learning the engine clutch kiss point shown in FIG. 7.

Referring to FIGS. 1, 4, and 7, in a learning condition satisfaction checking step (or a learning condition enablement checking step) 205, the controller 505 may determine whether a kiss point learning condition of the engine clutch 525 which connects the engine 510 with the motor 530 or disconnects the engine from the motor is satisfied.

According to a first kiss point learning step 210, the controller 505 may learn (or detect) the first kiss point when the kiss point learning condition is satisfied.

An embodiment of the first kiss point learning step 210 is explained as follows. The controller 505 may use a device shown in FIG. 5 to control speed of the motor 530 to be maintained at the first speed. When the controller 505 uses the device shown in FIG. 5 to control speed of the motor, a target speed control unit (not shown) instead of the no-load torque compensation control unit 111 shown in FIG. 1 may be used.

Referring to FIG. 5, the controller 505 may use feedback control to control the motor 530 so that an actual speed that is an output speed of the motor becomes the first speed that is a target speed of the motor. In more detail, the controller 505 may use closed-loop control to control speed of the motor 530 to be maintained at the first speed. The target speed and the actual speed of the motor 530 may be input to the controller 505 through a subtractor 305.

After the speed of the motor 530 is stabilized at the first speed, the controller 505 may learn the first kiss point of the engine clutch 525 by engaging the engine clutch so that the motor 530 having the first speed is connected to the engine 510. The controller 505 may select the first kiss point as a hydraulic pressure of the engine clutch 525 corresponding to a speed change amount threshold value of the motor which occurs when the engine clutch is engaged. The threshold value may be 10% to 30% of the motor speed value. The hydraulic pressure may be detected by a sensor that may be connected (or attached) to the engine clutch 525 and the detected pressure may be provided to the controller 505.

Another embodiment of the first kiss point learning step 210 is explained as follows. The controller 505 may use a control device shown in FIG. 6 to control speed of the motor 530 to be maintained at the first speed.

Referring to FIG. 6, the controller 505 may use feedforward control to control the motor 530 so that an actual speed that is an output speed of the motor becomes the first speed. In more detail, the controller 505 may use no-load torque compensation control that is open-loop control to control speed of the motor 530 to be maintained at the first speed.

After the speed of the motor 530 is stabilized at the first speed, the controller 505 may learn the first kiss point of the engine clutch 525 by engaging the engine clutch so that the motor 530 having the first speed is connected to the engine 510. The controller 505 may select the first kiss point as a hydraulic pressure of the engine clutch 525 corresponding to the second speed of the motor which is generated after the first kiss point is learned and the engine clutch is engaged. The hydraulic pressure may be detected by a sensor that may be connected to the engine clutch 525 and the detected pressure may be provided to the controller 505.

According to a second kiss point learning step 215, the controller 505 may learn the second kiss point after the first kiss point learning step 210.

An embodiment of the second kiss point learning step 215 is explained as follows. The controller 505 may use a device shown in FIG. 5 to control speed of the motor 530 to be maintained at the second speed. When the controller 505 uses the device shown in FIG. 5 to control speed of the motor, the target speed control unit instead of the no-load torque compensation control unit 111 shown in FIG. 1 may be used.

Referring to FIG. 5, the controller 505 may use feedback control to control the motor 530 so that the actual speed of the motor becomes the second speed that is a target speed of the motor.

After the speed of the motor 530 is stabilized at the second speed, the controller 505 may learn the second kiss point of the engine clutch 525 by engaging the engine clutch so that the motor 530 having the second speed is connected to the engine 510. The controller 505 may select the second kiss point as a hydraulic pressure of the engine clutch 525 corresponding to a speed change amount threshold value of the motor which occurs when the engine clutch is engaged. The hydraulic pressure may be detected by a sensor that may be connected to the engine clutch 525 and the detected pressure may be provided to the controller 505.

Another embodiment of the second kiss point learning step 215 is explained as follows. The controller 505 may use the control device shown in FIG. 6 to control speed of the motor 530 to be maintained at the second speed of the motor which is generated after the engine clutch 525 is engaged. The second speed of the motor 530 may be generated by the engine 510 having the specific speed.

Referring to FIG. 6, the controller 505 may use feedforward control to control the motor 530 so that an actual speed that is an output speed of the motor becomes the second speed. In more detail, the controller 505 may use no-load torque compensation control that is open-loop control to control speed of the motor 530 to be maintained at the second speed.

After the speed of the motor 530 is stabilized at the second speed, the controller 505 may learn the second kiss point of the engine clutch 525 by engaging the engine clutch so that the motor 530 having the second speed is connected to the engine 510. The controller 505 may select the second kiss point as a hydraulic pressure of the engine clutch 525 corresponding to the third speed of the motor which is generated after the second kiss point is learned and the engine clutch is engaged. The hydraulic pressure may be detected by a sensor that may be connected to the engine clutch 525 and the detected pressure may be provided to the controller 505.

According to a kiss point storing step 220, the controller 505 may select the average value of the first kiss point and the second kiss point as the kiss point of the engine clutch 525 when the standard deviation of the first kiss point and the second kiss point is less than or equal to the threshold value. The controller 505 may store the selected kiss point in a storage unit (or a storage device). The storage unit may be disposed in the controller 505 or outside the controller 505.

When the standard deviation of the first kiss point and the second kiss point is not less than or equal to the threshold value, the controller 505 may use the device shown in FIG. 5 to control speed of the motor 530 to be maintained at the third speed after the second kiss point is learned. When the controller 505 uses the device shown in FIG. 5 to control speed of the motor, the target speed control unit instead of the no-load torque compensation control unit 111 shown in FIG. 1 may be used.

Referring to FIG. 5, the controller 505 may use feedback control to control the motor 530 so that the actual speed of the motor becomes the third speed that is a target speed of the motor.

After the speed of the motor 530 is stabilized at the third speed, the controller 505 may learn the third kiss point of the engine clutch 525 by engaging the engine clutch so that the motor 530 having the third speed is connected to the engine 510. The controller 505 may select the third kiss point as a hydraulic pressure of the engine clutch 525 corresponding to a speed change amount threshold value of the motor which occurs when the engine clutch is engaged. The hydraulic pressure may be detected by a sensor that may be connected to the engine clutch 525 and the detected pressure may be provided to the controller 505.

The controller 505 may select the average value of the first kiss point and the second kiss point and the third kiss point as the kiss point of the engine clutch 525 when the standard deviation of the first kiss point and the second kiss point and the third kiss point is less than or equal to the threshold value, and may store the selected value in the storage unit.

Another embodiment of the third kiss point learning step is explained as follows.

When the standard deviation of the first kiss point and the second kiss point is not less than or equal to the threshold value, the controller 505 may use the control device shown in FIG. 6 to control speed of the motor 530 to be maintained at the third speed of the motor which is generated after the second kiss point is learned and the engine clutch 525 is engaged. The third speed of the motor 530 may be generated by the engine 510 having the specific speed. Speed of the engine 510 may be different to the first speed, the second speed, and the third speed of the motor 530.

Referring to FIG. 6, the controller 505 may use feedforward control to control the motor 530 so that an actual speed that is an output speed of the motor becomes the third speed. In more detail, the controller 505 may use no-load torque compensation control that is open-loop control to control speed of the motor 530 to be maintained at the third speed.

After the speed of the motor 530 is stabilized at the third speed, the controller 505 may learn the third kiss point of the engine clutch 525 by engaging the engine clutch so that the motor 530 having the third speed is connected to the engine 510. The controller 505 may select the third kiss point as a hydraulic pressure of the engine clutch 525 corresponding to the fourth speed of the motor which is generated after the third kiss point is learned and the engine clutch is engaged. The hydraulic pressure may be detected by a sensor that may be connected to the engine clutch 525 and the detected pressure may be provided to the controller 505.

The controller 505 may select the average value of the first kiss point and the second kiss point and the third kiss point as the kiss point of the engine clutch 525 when the standard deviation of the first kiss point and the second kiss point and the third kiss point is less than or equal to the threshold value, and may store the selected value in the storage unit.

In another embodiment of the present invention, after the kiss point storing step 220, the controller 505 may determine whether the third speed is less than or equal to the learning limit speed which restricts learning for the kiss point of the engine clutch 525. The controller 505 may terminate learning for the kiss point of the engine clutch 525 when the third speed is less than or equal to the learning limit speed.

The embodiment of the method for learning an engine clutch kiss point is described in more detail as follows.

When the learning condition is satisfied, learning of multiple kiss points may be started. Maintenance of constant speed of the motor according to the no-load torque compensation may be included in the learning condition. When the constant speed of the motor is checked, kiss point learning using engagement control of the engine clutch 525 may be performed. When speed change amount of the motor which occurs when the engine clutch is engaged is greater than or equal to the set threshold value, control amount of the engine clutch may be temporarily selected (or stored) as the first kiss point of the learning. The control amount of the engine clutch may mean a hydraulic-pressure command value (or a stroke command value) that moves a friction member of the engine clutch. Because speed control for the motor 530 that includes no-load torque compensation control for the motor is continuously carried out, constant speed of the motor that has a different speed may be checked after the first kiss point is detected. After the constant speed is checked, the second kiss point learning may be performed and the second kiss point may be temporarily selected. As long as the learning condition is satisfied, learning for multiple kiss points that is similar to the kiss point learning method and includes the nth kiss point learning may be performed. The n may be a natural number that is three or more.

When the learning is completed, the average value of kiss points that is temporarily stored and the standard deviation may be calculated. Learning reliability may be given only when the standard deviation is less than or equal to the set threshold value so that the calculated average value may be selected and stored as the representative value of kiss point.

The learning may also be applied to kiss point learning according to temperature of the engine clutch that may influence the engine clutch control. In more detail, learning for multiple kiss points according to the temperature may be possible.

As described above, the embodiment of the present invention may improve robustness of kiss point learning for the engine clutch by learning multiple kiss points.

The components, "~unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present invention and are not used for qualifying the meaning or limiting the scope of the present invention, which is disclosed in the appended claims. Therefore, it will be understood by those skilled in the art that various modifications and equivalent exemplary embodiments are possible from the present invention. Accordingly, the actual technical protection scope of the present invention must be determined by the spirit of the appended claims.

What is claimed is:

1. A method for learning an engine clutch kiss point of a hybrid vehicle, comprising the steps of:
   determining, by a controller, whether a kiss point learning condition of an engine clutch which connects an engine with a motor or disconnects the engine from the motor is satisfied;
   controlling, by the controller, a speed of the motor to be maintained at a first speed when the kiss point learning condition is satisfied;
   learning, by the controller, a first kiss point of the engine clutch by engaging the engine clutch so that the motor having the first speed is connected to the engine;
   controlling, by the controller, the speed of the motor to be maintained at a second speed after the first kiss point of the engine clutch is learned;
   learning, by the controller, a second kiss point of the engine clutch by engaging the engine clutch so that the motor having the second speed is connected to the engine; and
   selecting, by the controller, an average value of the first kiss point and the second kiss point as the engine clutch kiss point when a standard deviation of the first kiss point and the second kiss point is less than or equal to a threshold value.

2. The method of claim 1, wherein the controller determines that the kiss point learning condition is satisfied when a transmission transmitting output from the engine and the motor is in a park stage or a neutral stage.

3. The method of claim 1, wherein the controller determines that the kiss point learning condition is satisfied when a transmission transmitting output from the engine and the motor is in a drive stage and the hybrid vehicle is in coasting drive.

4. The method of claim 1, further comprising the steps of:
   controlling, by the controller, the speed of the motor to be maintained at a third speed after the second kiss point is learned when the standard deviation of the first kiss point and the second kiss point is not less than or equal to the threshold value;
   learning, by the controller, a third kiss point of the engine clutch by engaging the engine clutch so that the motor having the third speed is connected to the engine; and
   selecting, by the controller, an average value of the first kiss point, the second kiss point, and the third kiss point as the engine clutch kiss point when a standard deviation of the first kiss point, the second kiss point, and the third kiss point is less than or equal to the threshold value.

5. The method of claim 4, further comprising the steps of:
   determining, by the controller, whether the third speed is less than or equal to a learning limit speed which restricts learning for the engine clutch kiss point; and
   terminating, by the controller, learning for the engine clutch kiss point when the third speed is less than or equal to the learning limit speed.

6. The method of claim 1, further comprising the step of:
   selecting, by the controller, the first kiss point or the second kiss point as a hydraulic pressure of the engine clutch corresponding to a speed change amount threshold value of the motor which occurs when the engine clutch is engaged.

7. A method for learning an engine clutch kiss point of a hybrid vehicle, comprising the steps of:
   determining, by a controller, whether a kiss point learning condition of an engine clutch which connects an engine with a motor or disconnects the engine from the motor is satisfied;
   controlling, by the controller, a speed of the motor to be maintained at a first speed when the kiss point learning condition is satisfied;
   learning, by the controller, a first kiss point of the engine clutch by engaging the engine clutch so that the motor having the first speed is connected to the engine;
   controlling, by the controller, the speed of the motor to be maintained at a second speed of the motor which is generated after the engine clutch is engaged;
   learning, by the controller, a second kiss point of the engine clutch by engaging the engine clutch so that the motor having the second speed is connected to the engine; and
   selecting, by the controller, an average value of the first kiss point and the second kiss point as the engine clutch kiss point when a standard deviation of the first kiss point and the second kiss point is less than or equal to a threshold value.

8. The method of claim 7, wherein the controller determines that the kiss point learning condition is satisfied when a transmission transmitting output from the engine and the motor is in a park stage or a neutral stage.

9. The method of claim 7, wherein the controller determines that the kiss point learning condition is satisfied when a transmission transmitting output from the engine and the motor is in a drive stage and the hybrid vehicle is in coasting drive.

10. The method of claim 7, further comprising the steps of:
controlling, by the controller, the speed of the motor to be maintained at a third speed of the motor which is generated after the second kiss point is learned and the engine clutch is engaged when the standard deviation of the first kiss point and the second kiss point is not less than or equal to the threshold value;
learning, by the controller, a third kiss point of the engine clutch by engaging the engine clutch so that the motor having the third speed is connected to the engine; and
selecting, by the controller, an average value of the first kiss point, the second kiss point, and the third kiss point as the engine clutch kiss point when a standard deviation of the first kiss point, the second kiss point, and the third kiss point is less than or equal to the threshold value.

11. The method of claim 10, further comprising the steps of:
determining, by the controller, whether the third speed is less than or equal to a learning limit speed which restricts learning for the engine clutch kiss point; and
terminating, by the controller, learning for the engine clutch kiss point when the third speed is less than or equal to the learning limit speed.

12. The method of claim 7, further comprising the steps of:
selecting, by the controller, the first kiss point as a hydraulic pressure of the engine clutch corresponding to the second speed; and
selecting, by the controller, the second kiss point as the hydraulic pressure of the engine clutch corresponding to a third speed of the motor which is generated after the second kiss point is learned and the engine clutch is engaged.

13. A device for learning an engine clutch kiss point of a hybrid vehicle, comprising:
an engine clutch which connects an engine with a motor or disconnects the engine from the motor; and
a controller which determines whether kiss point learning condition of the engine clutch is satisfied,
wherein the controller controls a speed of the motor to be maintained at a first speed when the kiss point learning condition is satisfied,
the controller learns a first kiss point of the engine clutch by engaging the engine clutch so that the motor having the first speed is connected to the engine,
the controller controls the speed of the motor to be maintained at a second speed of the motor which is generated after the engine clutch is engaged,
the controller learns a second kiss point of the engine clutch by engaging the engine clutch so that the motor having the second speed is connected to the engine, and
the controller selects an average value of the first kiss point and the second kiss point as the engine clutch kiss point when a standard deviation of the first kiss point and the second kiss point is less than or equal to a threshold value.

14. The device of claim 13, wherein the controller determines that the kiss point learning condition is satisfied when a transmission transmitting output from the engine and the motor is in a park stage or a neutral stage.

15. The device of claim 13, wherein the controller determines that the kiss point learning condition is satisfied when a transmission transmitting output from the engine and the motor is in a drive stage and the hybrid vehicle is in coasting drive.

16. The device of claim 13, wherein the controller controls the speed of the motor to be maintained at a third speed of the motor which is generated after the second kiss point is learned and the engine clutch is engaged when the standard deviation of the first kiss point and the second kiss point is not less than or equal to the threshold value,
the controller learns a third kiss point of the engine clutch by engaging the engine clutch so that the motor having the third speed is connected to the engine, and
the controller selects an average value of the first kiss point, the second kiss point, and the third kiss point as the engine clutch kiss point when a standard deviation of the first kiss point, the second kiss point, and the third kiss point is less than or equal to the threshold value.

17. The device of claim 16, wherein the controller determines whether the third speed is less than or equal to a learning limit speed which restricts learning for the engine clutch kiss point, and
the controller terminates learning for the engine clutch kiss point when the third speed is less than or equal to the learning limit speed.

18. The device of claim 13, wherein the controller selects the first kiss point as a hydraulic pressure of the engine clutch corresponding to the second speed, and
the controller selects the second kiss point as the hydraulic pressure of the engine clutch corresponding to a third speed of the motor which is generated after the second kiss point is learned and the engine clutch is engaged.

* * * * *